United States Patent Office 3,030,706
Patented Apr. 24, 1962

3,030,706
ALUMINUM COATED WELDING ELECTRODE
AND METHOD OF PRODUCING THE SAME
Ronald E. Griffiths, Cleveland Heights, and Arch W.
Harris, Warrensville Township, Cuyahoga County,
Ohio, assignors to United States Steel Corporation, a
corporation of New Jersey
No Drawing. Filed Jan. 11, 1955, Ser. No. 481,258
2 Claims. (Cl. 29—528)

This invention relates to improvements in the manufacture of welding electrodes.

One of the problems encountered in fusion welding wherein the electrode provides the source of deposited metal is porosity in the deposited metal which lowers the strength thereof. Since aluminum is a known deoxidizer, it has been proposed to add aluminum to the welding electrode but this renders ferrous metals incapable of being formed and drawn into wire of the desired size. We have discovered however, that predominantly aluminum coatings, if applied in accordance with the teachings of our invention can be used to advantage in many types of welding.

In present day continuous welding machines, the electrode wire is continuously fed through a welding head wherein it makes a sliding electrical contact with a sleeve through which the welding current is applied to the wire. Thus the surface of the electrode must be smooth and abrasion resistant. Moreover, to be fully effective as an electrode, the aluminum coated wire must not only have a smooth surface but also the aluminum coating must be of uniform thickness.

It is accordingly an object of our invention to provide an improved welding electrode and method of producing the same.

In accordance with the teachings of our invention, wire to be coated is cleaned by conventional practice, such as heating in air or a lead pan to burn off any lubricants thereon and pickled in an acid solution to remove any oxide. It is thereafter quickly introduced into a reducing or nonoxidizing atmosphere wherein it is heated and then introduced in a bath of molten aluminum while still protected by such atmosphere. The wire is heated to at least 1200° F. and preferably to the bath temperature. The bath may be relatively pure aluminum except for impurities or may contain up to about 12.5% silicon to reduce the formation of the brittle intermetallic iron-aluminum alloy. The molten coating bath is maintained at a temperature between 1225° F. and 1300° F., preferably about 1250° F., and the time of immersion is regulated to produce a coating weighing less than .40 ounce per square foot. The coated wire is withdrawn from the pot and the coating solidified thereon.

Following solidification, the coated wire is cold drawn through a reducing die at least enough to work the coating throughout. To achieve this the diameter of the coated wire must be reduced at least about 10% in cross-sectional area.

The wire forming the base metal may be any metal that it is desired to deposit. In most forms, it will be ferrous metal of plain carbon, alloy or "stainless" grades. Non-ferrous metals such as titanium, nickel, copper and alloys thereof may be coated. As in all fusion welding, the base metal used is designed to give a weld bead of similar characteristics as the metal being joined together. One type of electrode frequently used is low-metaloid ferrous stock. A common specification for this is

| | Percent max. |
|---|---|
| Carbon | .05 |
| Manganese | .17 |
| Phosphorus | .025 |
| Sulphur | .035 |
| Silicon | .03 |
| Copper | .05 |

We have successfully formed coated electrode of such stock containing:

| | Percent |
|---|---|
| Carbon | .05 |
| Manganese | .12 |
| Phosphorus | .012 |
| Sulphur | .035 |
| Silicon | .01 |

Balance iron and residual impurities.

Wire of ⅛" diameter of this steel was heated in air to remove the lubricants thereafter and was thereafter pickled in a 10% by weight hydrochloric acid solution to remove any oxide on the wire. As it left the pickling bath, the wire was washed in hot water and introduced into a nonoxidizing atmosphere comprising dissociated ammonia and heated therein to a temperature of about 1250° F. Without exposure to air, it was then introduced into a bath of a substantially pure aluminum except for contaminating elements, maintained at a temperature of about 1250° F. The time of immersion was regulated to produce a coating having a weight of .3 ounce per square foot of wire surface. After solidification, the coated wire was cold drawn to reduce the diameter about 11%.

Electrodes coated with aluminum as above, permit, in the case of ferrous base metal, higher amperage welding currents since aluminum is a better conductor than iron and thereby permits higher welding speeds. The aluminum produces more fluidity in the weld deposit and this along with its deoxidizing effect produces more uniform deposits with greater freedom from porosity, particularly in the so-called "automatic" types wherein the arc is shielded by gas or the metal is deposited under a blanket of flux.

While we have shown and described several specific embodiments of our invention, it will be understood that these embodiments are merely for the purpose of illustration and description and that various other forms may be devised within the scope of our invention as defined in the appended claims.

We claim:

1. A method of producing aluminum coated electrodes of low-metalloid ferrous stock comprising forming electrode stock of steel containing

| | Percent maximum |
|---|---|
| Carbon | .05 |
| Manganese | .17 |
| Phosphorus | .025 |
| Sulphur | .035 |
| Silicon | .03 |
| Copper | .05 | with the balance substantially iron, cleaning said stock, heating said stock in a nonoxidizing atmosphere to at least 1200° F., passing said stock through a coating bath comprising molten aluminum, maintaining the temperature of the bath between 1220° F. and 1300° F., soldifying the coating thereon and then cold drawing the coated electrode stock to produce a compact, uniform aluminum coating on said stock.

2. A method of producing aluminum coated electrode of low-metalloid ferrous stock comprising forming electrode stock of steel containing

| | Percent maximum |
|---|---|
| Carbon | .05 |
| Manganese | .17 |
| Phosphorus | .025 |
| Sulphur | .035 |
| Silicon | .03 |
| Copper | .05 | cleaning said stock, heating said stock in a nonoxidizing atmosphere to about 1250° F., passing said stock through a coating bath comprising molten aluminum, maintaining said bath at a temperature of about 1250° F., regulating the time of immersion of said stock in said bath to maintain the applied coating to less than .4 ounce per square foot, solidifying the coating thereon and then cold drawing the coated electrode stock to reduce the cross-sectional area at least about 10% to produce a compact uniform aluminum coating thereon.

References Cited in the file of this patent

UNITED STATES PATENTS

| | | |
|---|---|---|
| 1,277,639 | Pescatore | Sept. 3, 1918 |
| 1,794,983 | Ritter | Mar. 3, 1931 |
| 2,319,977 | Cape et al. | May 25, 1943 |
| 2,543,936 | Reynolds | Mar. 6, 1951 |
| 2,686,355 | Lundin | Aug. 17, 1954 |

OTHER REFERENCES

"The Metal-Iron," by Cleaves and Thompson, first edition, published for The Engineering Foundation by McGraw-Hill Book Company, Inc., 1935, (page 72 relied on). (Copy in Division 3.)